G. A. JASPER.
Refining Sugar.
No. 63,390.  Patented April 2, 1867.
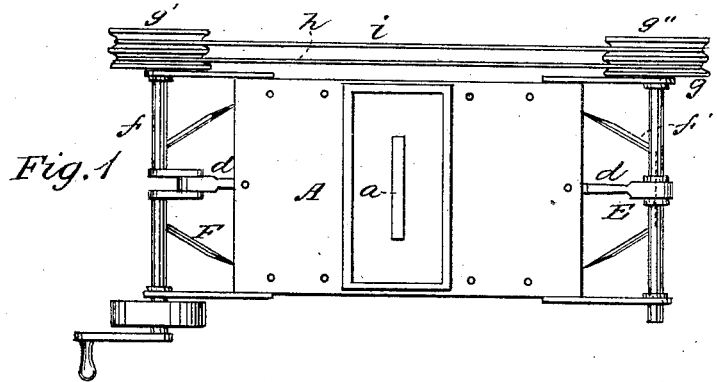
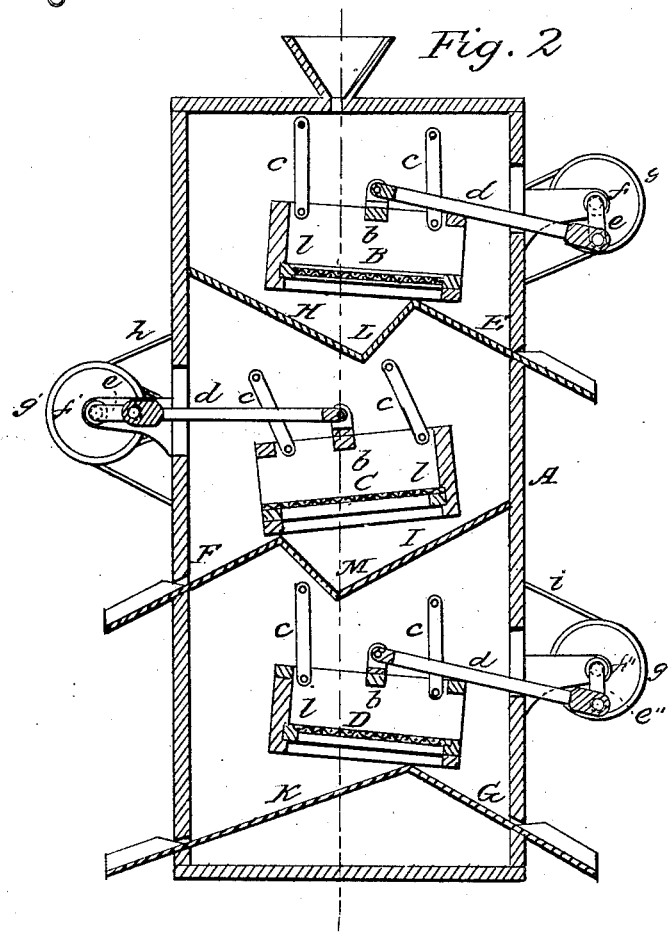
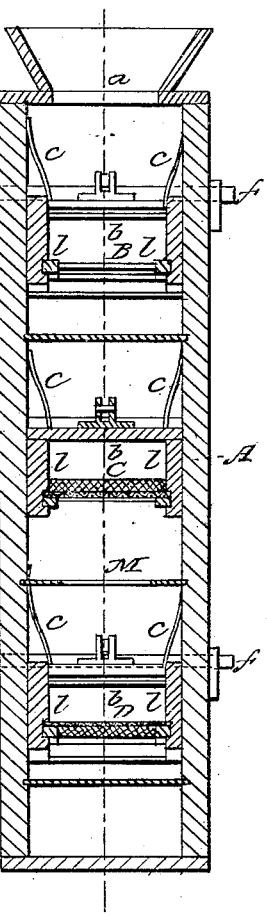
Witnesses:
Geo. H. Andrews
Samuel N. Piper
Inventor:
Austarus A. Jasper
by his attorney
R. W. Cody

United States Patent Office.

GUSTAVUS A. JASPER, OF CHARLESTOWN, MASSACHUSETTS.

*Letters Patent No. 63,390, dated April 2, 1867.*

---

IMPROVED APPARATUS FOR SIFTING AND SEPARATING SUGAR.

---

*The Schedule referred to in these Letters Patent and making part of the same.*

---

TO ALL PERSONS TO WHOM THESE PRESENTS SHALL COME:

Be it known that I, GUSTAVUS A. JASPER, of Charlestown, in the county of Middlesex, and State of Massachusetts, have made a new and useful invention having reference to the Sifting of Sugar or other material; and I do hereby declare the same to be fully described in the following specification and represented in the accompanying drawings, of which—

Figure 1 is a top view.

Figure 2, a vertical and longitudinal section of my new and useful or improved sifting apparatus or mechanism.

Figure 3 is a vertical and transverse section of it.

It consists of a peculiar arrangement of reciprocating sieves, discharging-chutes and spouts, and mechanism for imparting to each of such sieves a vibratory or reciprocating motion.

The object of the invention is to separate the coarser from the finer portions of the sugar so as to prevent the fine flour or dust of the sugar from congregating on and adhering to such coarser portion. This I accomplish by first screening from the mass and removing from the sifting-box or chamber the lumps or coarser portions of the sugar, leaving the finer or finest portions to be last removed from the said box or case.

In the drawings, A denotes an upright box or case provided with an opening, $a$, in its top, to which opening a hopper, or its equivalent, to contain the sugar to be screened, is to be applied. Below the hopper is a series of sieves, B C D, one being arranged underneath the other, as shown in the drawings. The frame $b$ of each sieve is open at one end and closed at the other, the open end being situated over the mouth of one of a series of discharging-spouts, E F G, which leads out of the box. One of the spouts leads out of one side, while the next one leads out of the opposite side of such box, as shown in the drawings. Besides the spout, to each of the sieves there is one of a series of inclined planes or chutes, H I K, the same serving, in connection with one of a series of partitions or floors, L M, to receive the material discharged through the meshes of the sieve and convey it into the upper part of the next sieve below. The lowermost plane K discharges through the side of the box or case A. Each sieve is arranged somewhat inclined to the horizon, and is suspended to the opposite sides of the box A by means of rods or hangers $c\,c$, so as to be capable of being swung or moved lengthwise back and forth. For the purpose of so moving each sieve it has one of a series of connecting-rods, $d\,d\,d$, jointed to it, such rod also being jointed to one of a series of bell-cranks, $e\,e'\,e''$, of horizontal shafts $f\,f'\,f''$, arranged as represented in the drawings. Each of such shafts has one of a series of pulleys, $g\,g'\,g''$, fixed upon it. Endless bands $h\,i$ extend from and around the middle one of these pulleys, to and about the other pulleys $g\,g''$, as shown in the drawings, the same being so that when the shaft of the pulley $g'$ is put in revolution rotary motion may be imparted to each of the other shafts $f\,f''$.

In the operation of the said sifting apparatus the coarsest lumps of the sugar will be discharged from the end of the upper sieve, such portions as may be able to pass through the meshes of such sieve being caused to fall upon the inclined plane below it, and by such be directed into the upper part of the next sieve. The coarser portions of the mass, or such as cannot go through the meshes of the second sieve, will flow out of its open end, while the rest will go through the sieve, and by the chute below it will be discharged upon the upper part of the third sieve. From the last sieve the coarser portions of the mass will be discharged at its open end, the finer, or powder, going through the meshes and being discharged out of the box. By this mode of sifting we avoid much of the wear and abrasion of the larger masses, lumps, or crystals of sugar, and are enabled to remove them from the mass with little or no accumulation of powder or sugar upon them. Each sieve box is to be constructed with grooves $l\,l$ in its opposite sides to receive the sieve, which is to slide into such grooves as a drawer does into its frame, the same being so as to enable the sieve to be removed from the frame and another sieve, of either larger or finer meshes to be substituted for it, as occasion may require.

I claim the arrangement of chutes, sieves, discharging-spouts, and mechanism for operating such sieves substantially as described.

GUSTAVUS A. JASPER.

Witnesses:
R. H. EDDY,
L. MÖLLER.